W. O. DUNTLEY.
CONTROLLER FOR ELECTRIC DRILLS.
APPLICATION FILED SEPT. 7, 1906.
991,431.
Patented May 2, 1911.
4 SHEETS—SHEET 3.
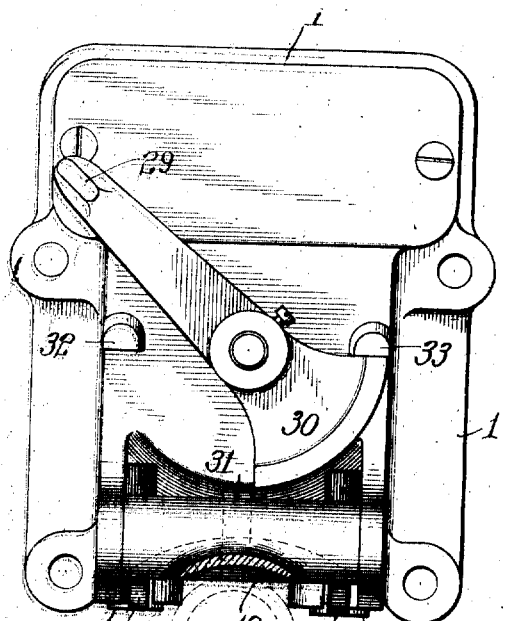
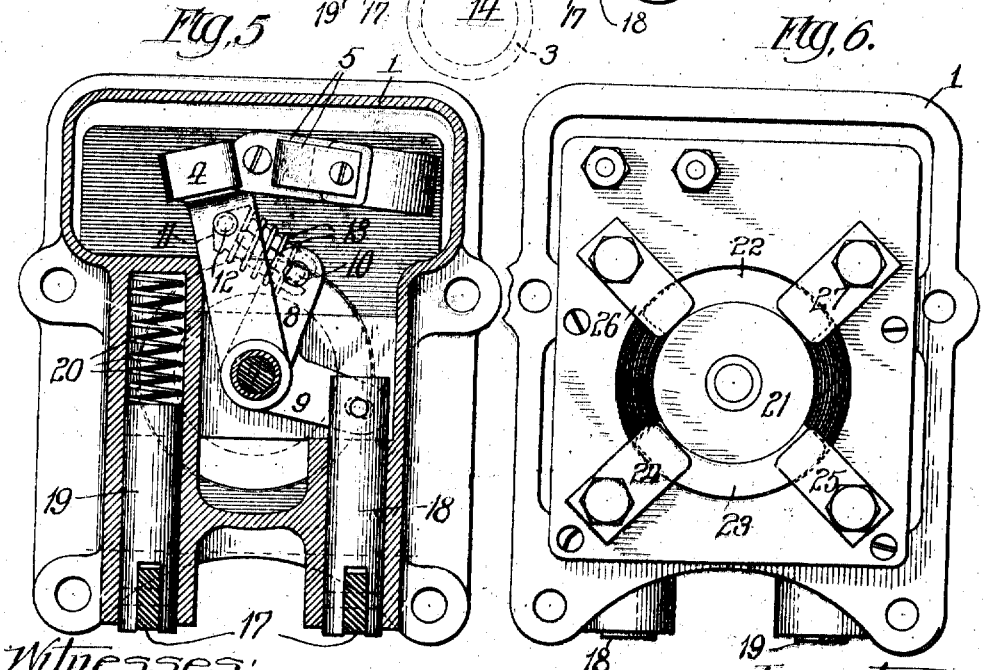

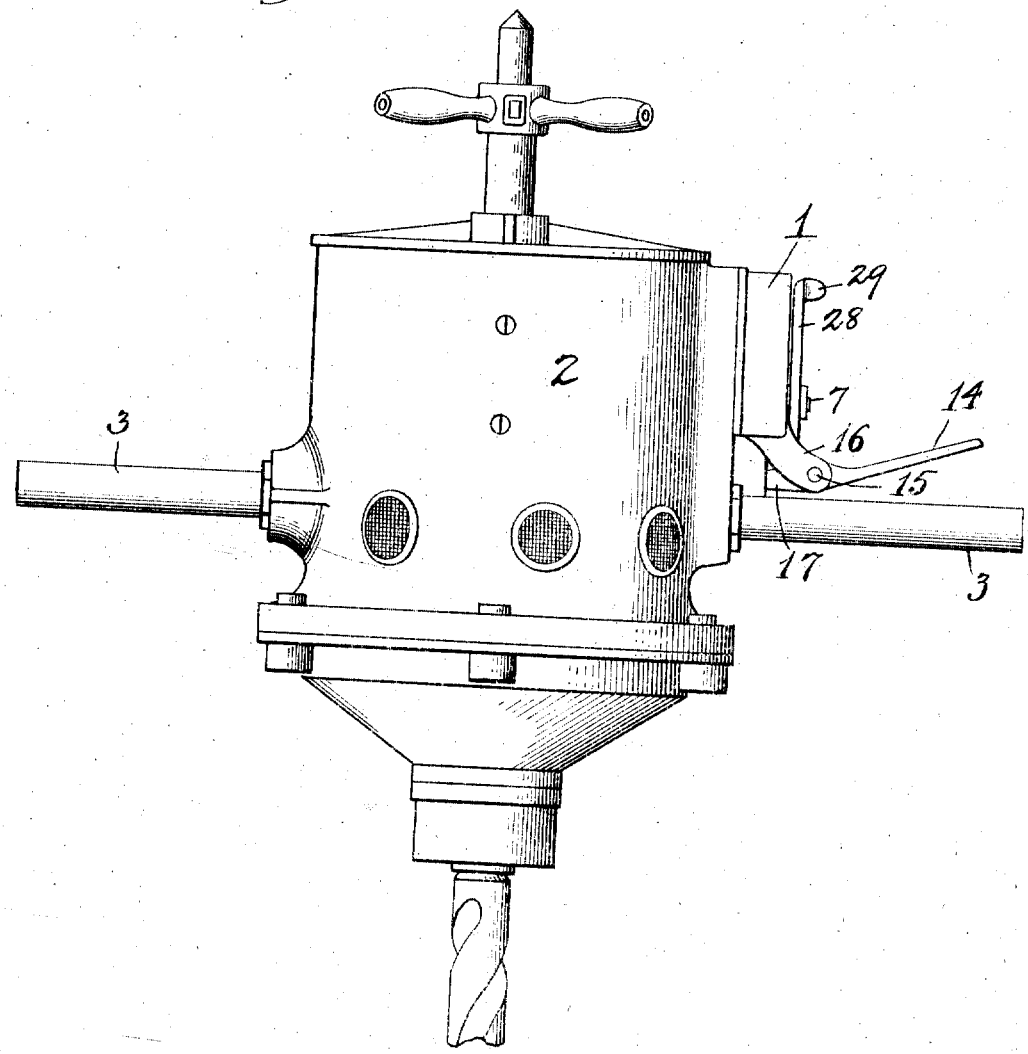

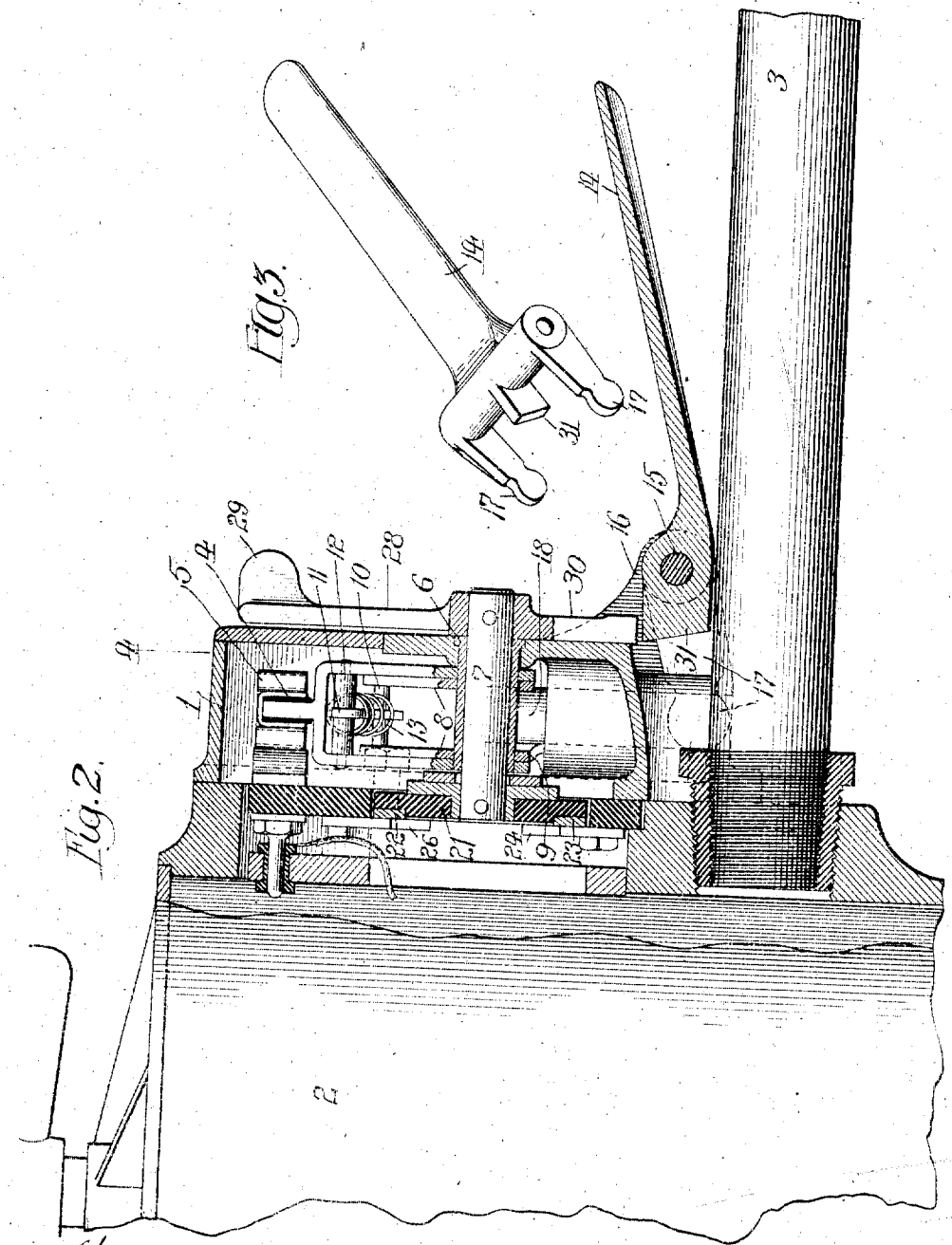

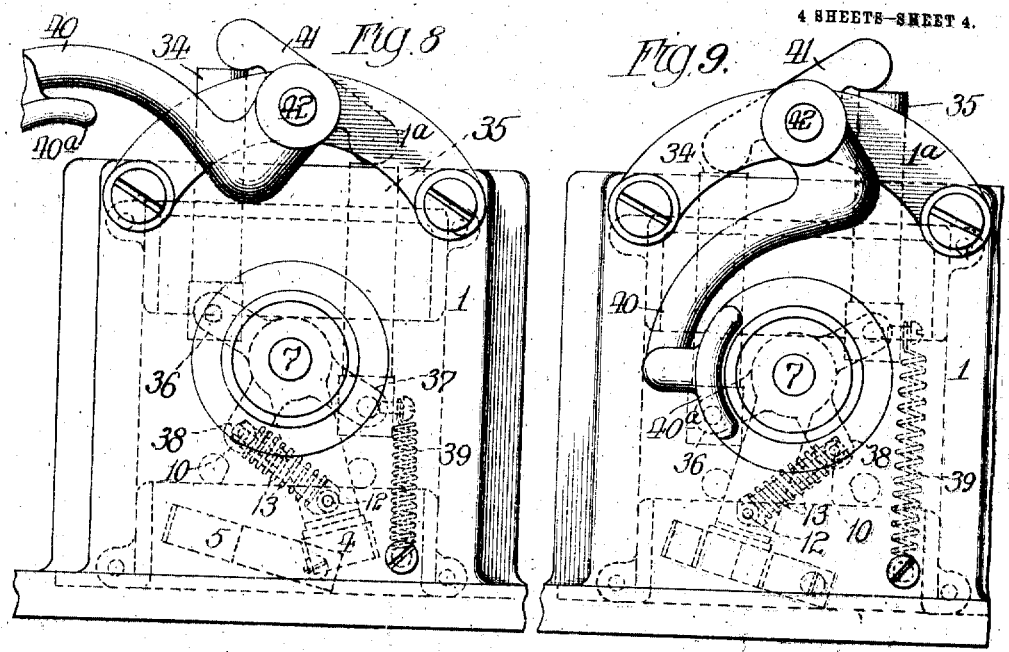
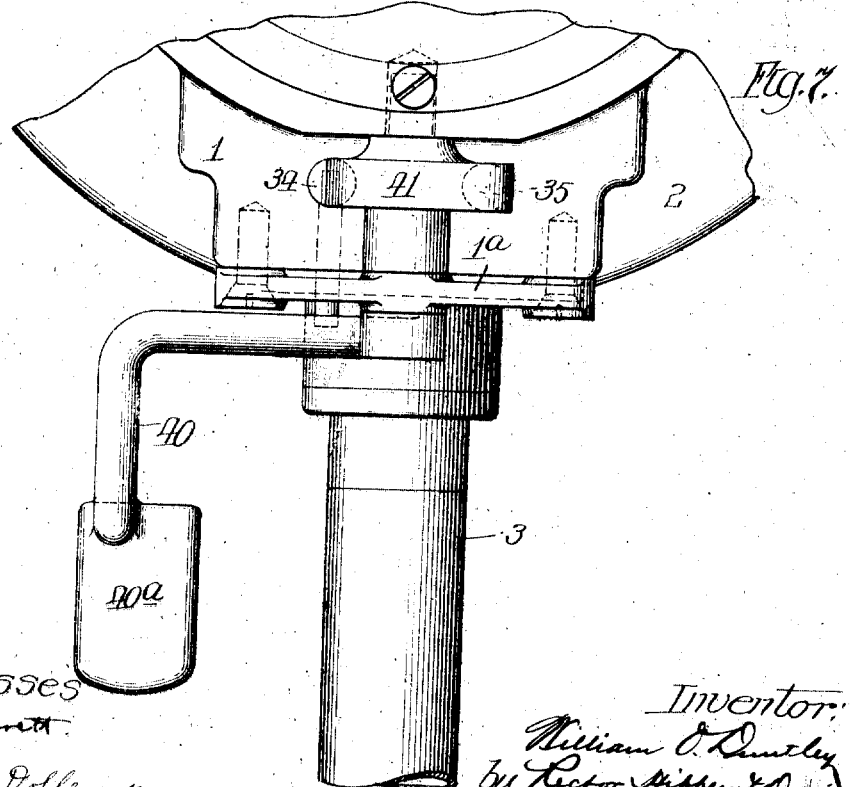

UNITED STATES PATENT OFFICE.

WILLIAM O. DUNTLEY, OF CHICAGO, ILLINOIS, ASSIGNOR TO CHICAGO PNEUMATIC TOOL COMPANY, OF CHICAGO, ILLINOIS, A CORPORATION OF ILLINOIS.

CONTROLLER FOR ELECTRIC DRILLS.

991,431.  Specification of Letters Patent.  Patented May 2, 1911.

Application filed September 7, 1906. Serial No. 333,634.

*To all whom it may concern:*

Be it known that I, WILLIAM O. DUNTLEY, a citizen of the United States, residing in Chicago, Cook county, Illinois, have invented certain new and useful Improvements in Controllers for Electric Drills, of which the following is a specification.

My invention relates to a controller or switch for electric drills and the object thereof is to provide a simple, efficient and reliable controller of this character possessing features of advantage and utility as will be hereinafter made apparent.

In the drawings, Figure 1 is an elevation of my new controller or switch shown applied to an electric drill; Fig. 2 a sectional elevation of a portion thereof on a larger scale, showing the switch in section and a part of the drill in elevation; Fig. 3 a perspective of the operating handle of the switch; Fig. 4 a front elevation of the switch box or casing but showing the handle in section; Fig. 5 a sectional elevation on the line 4 of Fig. 2; Fig. 6 a rear elevation of the switch box or casing; Fig. 7 a plan view of a modified construction of switch; Fig. 8 a side elevation thereof showing the switch in "off" position and Fig. 9 a similar view but with the switch shown in "on" position.

Referring to the present embodiment of my invention as herein illustrated, the switch or controller is contained within a casing 1 which is adapted to be applied and secured to one side of the main casing or shell 2 of the controller. The controller or switch is so constructed and arranged as to be a self-contained or unitary structure which may be readily attached to and detached from the main casing of the drill with ease and facility, both in the assembling of the machine or for the repairing or inspection of the controller or switch, as may be desired. It will therefore be observed that the controller or switch is bodily attachable to and detachable from a drill proper. Furthermore, the controller is provided with suitable and efficient means whereby the switch proper may be readily operated by that hand of the operator which holds the grasping handle marked 3 of the drill, there being a similar grasping handle on the opposite side of the drill casing.

Referring to the switch proper, the same is, as clearly shown in Figs. 1, 2 and 5, of the novel type comprising the knife blade 4 adapted to coöperate with the stationary contacts 5 forming a part of an electrical circuit in which the electric motor or motors of the drill are interposed. As shown in Fig. 2, the knife blade is in the form of a yoke which is adapted to rock upon a sleeve 6 loosely mounted upon a transverse shaft or arbor 7 extending transversely of the switch box or casing 1. To this sleeve is secured a pair of arms 8 one of which is in the form of a bell-crank owing to the provision of an extension 9 thereon. These arms 8 are connected at their upper ends by means of a cross pin 10 which is arranged to coöperate with a slotted or U-shaped plate 11 whose slot engages the cross pin 10. This U-shaped plate is pivotally connected to the yoke of the knife blade by means of the cross-pin or sleeve 12 arranged between the parallel arms thereof. By the rocking of the arms 8 the knife blade 4 is caused to enter between the stationary contacts 5 against the tension of the spring 13, the relative movements of the parts being obvious from an inspection of Fig. 5.

Referring next to the means for actuating the switch proper just described, such operating means comprise a handle proper 14, which is pivoted upon the fulcrum pin 15 arranged between the bearing lugs 16 extending outwardly from the side of the switch box or casing as clearly shown in Figs. 2 and 4. As shown in said figures, the handle is normally in the oblique or angular position with respect to the grasping handle 3, being held in such position with a yielding pressure in a manner hereinafter described. Moreover the inner or under surface and in the present instance the entire handle proper is curved to correspond with the curvature or contour of the grasping handle, with the result that when the operating handle is depressed for the purpose of turning on the current to the electric motor the handle will fit closely and snugly upon the grasping handle. At its inner end the operating handle is made U-shaped by the provision of the two parallel arms 17, one of which coöperates with an operating connection for actuating the switch proper.

As herein shown, more particularly in Fig. 6, this operating connection consists of a plunger 18 movable vertically in a bore or cylinder formed in the switch box or casing, such plunger being pivotally connected at its lower end to one of the arms 17 and at its upper end to the arm 9, with the result that when the switch handle 14 is grasped and brought into contact with the grasping handle 13, the switch proper will be operated and the crank will be turned on to the electric motor. By preference, in order to balance the structure and also to provide means for holding the handle 14 in a normal position with a yielding pressure, I provide a second plunger 19 which is pivotally connected at its lower end to the other of the arms 17. This plunger 19 is movable in a bore or cylinder in the switch box or casing and is movable inwardly against the tension of a coiled spring 20 interposed between the inner end of such plunger and the upper end of the bore. It will thus be seen that when the operating handle 14 is brought in position to operate the switch, it is moved against the tension of the spring 20, which, when the grasp of the operator on the handle 14 is released, restores the parts to their normal position, at which time the current is turned off the motor. Thus the normal condition of the motor is one in which the current is shut off, the current being turned on when the operator grasps both the handles 3 and 14, which condition is maintained so long as both of the handles are grasped by the operator.

My invention also involves novel and efficient means for reversing the switch so as to cause the motor to run in one direction or the other and also to lock the switch against reversal except when the switch is open and the current turned off. In the present instance the reversing and locking devices are parts of the same mechanism. As herein shown the reversing switch comprises a rotatable disk 21 which is connected with the cross shaft or arbor 7 and adapted to be rocked thereby. This disk is provided with contacts in the form of segments 22 and 23 arranged on opposite sides of the disk, such segments constituting the movable members or contacts which are adapted to coöperate with the series of four stationary contacts or terminals, consisting of the four contact strips 24, 25, 26 and 27. The relative arrangement of these parts is such that two of the stationary contacts coöperate with the same movable contact when the reversing switch is in one position or the other. For operating the reversing switch I secure to the arbor 7 an operating lever 28 having at its end a finger-piece 29 for convenient manipulation. The lower end of this operating lever is extended beyond its axis and formed as a segment 30 designed to coöperate with a stop lug or projection 31 extending inwardly from the fulcrum of the switch handle 14 and in axial alinement with such handle as illustrated in Fig. 3. The relative arrangement of the operating lever 28 and the stop lug 31 is such that the lever can be rocked only when the switch handle 14 is in its normal position shown in Figs. 1 and 2, at which time the stop lug is in its normal position clear of the path of movement of the segment 30 and in position to permit the operating lever 23 to be freely rocked in one direction or the other. To limit the movement of the lever 28 I provide the two stops 32 and 33 on opposite sides of its axis.

In the construction described it is impossible to reverse the switch at any time except when the switch handle 14 is in its normal or shut-off position as shown in Fig. 2, and moreover it is impossible to operate the switch handle unless the lever 28 of the reversing switch is in its home position for rotation of the motor in one direction or the other. If this lever should be at any other than these two extreme positions, the switch handle 14 could not be operated for the reason that the consequent upward movement of the stop lug 31 would be interfered with and prevented by the segment 30. The arrangement shown not only assures the proper position of the switch handle 14 when the switch is reversed, but also assures the proper positioning of the reversing switch mechanism when the switch handle 14 is to be operated.

For convenience I will refer in the claims to the normal position as the "off" position, inasmuch as the current is at that time turned off, and to the other position, when the switch handle is in contact with or in proximity to the grasping handle, as the "on" position inasmuch as at that time the current is turned on to the electric motor of the drill.

In Figs. 7, 8, and 9 of the drawings I have illustrated a modified construction of switch in which a lever normally held away from the grasping handle but adapted to be brought into contact therewith by the grasp of the operator to turn on the current, is operatively connected with the switch through the medium of plungers acting upon the switch. In the present instance the switch mechanism is inverted as compared with the position which it occupies on the construction hereinbefore described, but the corresponding parts in the present instance are similarly indicated by reference characters. In the present instance the two plungers 34 and 35 are both connected to the switch mechanism, the plunger 34 being connected to the arm 36 and the other plunger 35 to the arm 37, with the result that a third depending arm 38 is rocked in one direction or the other for the purpose of actuating the knife blade in the manner hereinbefore explained. The normal or off position of the switch which is illustrated in Fig. 8 is maintained in the absence of positive pressure by the operator by means of the coiled spring 39 acting upon the lower end of the plunger 35. These plungers are operated by a pick-shaped handle 40 through the medium of a two-armed lever 41 which is somewhat similar to a walking beam. The said lever 41 is secured to a short rock shaft 42 suitably mounted in a bracket 1ª secured to the casing or switch box 1 and to which also is secured the switch handle 40, with the result that when the switch handle is moved by the hand or by a finger of the operator to the position shown in Fig. 9, the lever 41 is moved to the position therein shown and the plunger 34 thereby depressed so as to operate the switch and to turn on the current to the electric drill.

By preference and for convenience in operating, the switch handle is provided with a finger or hand piece 40ª at its outer end, which is grooved to correspond with the curvature of the corresponding handle of the drill so that in operation the switch handle may be held firmly in on position by the same hand which grasps one of the grasping handles of the drill. It will be understood that when the plunger 34 is depressed to the position shown in Fig. 9 the other plunger 35 is caused to rise against the tension of its spring 39 so that when the grasp of or pressure applied by the operator is released such spring will depress the plunger 35 and lift the other plunger 34 and by that act will restore the switch handle 40 to normal position.

I claim:

1. In combination with an electric drill and its casing and grasping handles secured to opposite sides of such casing, an electric switch comprising a switch proper having terminals for making and breaking electrical connection, and a pivoted handle connected with the switch proper and arranged adjacent one of the handles in position to be actuated by the operator while grasping such particular handle.

2. In combination with an electric drill and its casing and grasping handles secured to opposite sides of such casing, an electric switch comprising a switch proper having terminals for making and breaking electrical connection, and a pivoted handle connected with the switch proper and arranged adjacent one of the handles in position to be brought into contact with or proximity to the grasping handle and held by the hand of the operator in the operation of the drill.

3. In combination with an electric drill and its casing and grasping handles secured to opposite sides of such casing, an electric switch comprising a switch proper having terminals for making and breaking electrical connection, and a handle connected with the switch proper and pivoted on the side of the casing adjacent the inner end of one of the grasping handles and normally projecting at an angle thereto but adapted to be brought theretoward to operate said switch to make electrical connection.

4. A switch for an electric drill comprising a switch proper having terminals for making and breaking electrical connection, a pivoted switch handle arranged adjacent the usual grasping handle of the drill and an operating connection between the switch handle and the switch proper consisting of a plunger 18.

5. A switch for an electric drill comprising a switch proper having terminals for making and breaking electrical connection, a pivoted switch handle arranged adjacent the usual grasping handle of the drill, and a pair of plungers one of which is operatively connected with the switch proper.

6. A switch for an electric drill comprising a switch proper having terminals for making and breaking electrical connection, a pivoted switch handle arranged adjacent the usual grasping handle of the drill, and a pair of parallel plungers one of which is operatively connected with the switch proper and the other of which is arranged to impart a yielding resistance to the switch handle.

7. A switch for an electric drill comprising a switch proper having terminals for making and breaking electrical connection, a pivoted switch handle arranged adjacent the usual grasping handle of the drill, a pair of plungers 18 and 19, one of which is operatively connected with the switch proper, and a spring coöperating with the other plunger to impart a yielding resistance to the "on" position of the switch handle.

8. A switch for an electric drill comprising a switch proper having terminals for making and breaking electrical connection, a pivoted switch handle arranged adjacent the usual grasping handle of the drill, and having a pair of arms 17, and a pair of plungers 18 and 19 connected with the arms 17, one of which plungers being operatively connected with the switch proper.

9. A switch for an electric drill comprising a switch proper having terminals for making and breaking electrical connection, a casing in which the switch proper is arranged and which is provided with a bore or cylinder, a plunger working in said bore and operatively connected with the switch proper, and a pivoted switch handle for actuating said plunger.

10. A switch for an electric drill comprising a switch proper having terminals for making and breaking electrical connection, a casing in which the switch proper is arranged and which is provided with a pair of parallel bores or cylinders, plungers working therein, one of which plungers being operatively connected with the switch proper, and a switch handle for actuating said plungers.

11. A switch for an electric drill comprising a switch proper having terminals for making and breaking electrical connection, a casing in which the switch proper is arranged and which is provided with a pair of parallel bores or cylinders, plungers working therein, one of which plungers being operatively connected with the switch proper, a spring exerting its tension against the other of the plungers, and a switch handle for actuating said plungers.

12. A switch for an electric drill comprising a switch proper having terminals for making and breaking electrical connection, and having an actuating member 9, a pair of plungers 18 and 19, one of which is connected with the member 9, and a pivoted switch handle for actuating the plungers.

13. A self contained switch for an electric drill comprising a casing adapted to be secured thereto, a switch proper within the casing, and a switch handle in the form of a lever pivoted upon the casing for operating the switch proper.

14. A self contained switch for an electric drill comprising a casing adapted to be secured thereto, a switch proper within the casing, said casing being secured to the drill at one side of one of the usual grasping handles of the drill, and a switch handle pivoted upon the lower or inner end of the casing and adjacent such grasping handle when applied to the drill, such switch-handle being operatively connected with the switch proper.

15. A controlling switch device for an electric drill comprising a main switch, a reversing switch, a switch handle adapted to operate the main switch and provided with a stop projection, and a rocking arm adapted to operate the reversing switch and movable in the plane of movement of said projection whereby when the handle and its projection is moved in the operation of turning the current on to the drill the said arm is locked against movement.

16. A controlling switch device for an electric drill comprising a main switch, a reversing switch, a switch handle adapted to operate the main switch and provided with a stop projection, and a rocking arm adapted to operate the reversing switch and provided at one end with a segment movable in the plane of movement of said projection to prevent movement of the latter except when the arm is in one or the other extreme of its positions and to be itself locked except when the handle is in "off" position.

17. A controlling device for an electric drill comprising a main switch, a reversing switch, a switch handle pivoted near one end and having an extension 31 projecting from its pivotal axis, an operating connection between the switch handle and the main switch, and a rocking arm 28 for operating the reversing switch and having a segment 30 movable in the plane of movement of said extension 31 to prevent movement of the latter except when the arm is in one or the other extreme of its positions.

18. A controlling device for an electric drill comprising a main switch, a reversing switch, an oscillating shaft or axis 7 for said reversing switch, a switch handle pivoted near one end and operatively connected with the main switch and a rocking arm 28 secured to the shaft 7 for operating the reversing switch and having a portion arranged to interfere with the movements of the switch handle to prevent movement of the latter except when the reversing switch is in one or the other of its extreme positions.

19. A switch for an electric drill comprising a switch proper having terminals for making and breaking electrical connection, means for normally holding the switch in "off" position with a yielding pressure, a pivoted switch handle arranged adjacent the usual grasping handle of the drill and an operating connection between the switch handle and the switch proper for operating the latter against said yielding pressure means.

WILLIAM O. DUNTLEY.

Witnesses:
S. E. HIBBEN,
ROBERT DOBBERMAN.